(12) United States Patent
Yan et al.

(10) Patent No.: US 11,287,054 B2
(45) Date of Patent: Mar. 29, 2022

(54) DRAIN PLUG LINKAGE DEVICE

(71) Applicant: Xiamen Forbetter Sanitary Ware Co., Ltd., Fujian (CN)

(72) Inventors: Xiliang Yan, Xiamen (CN); Mouyong Lin, Xiamen (CN); Yindong Mao, Xiamen (CN); Xingui Zhang, Xiamen (CN); Wenbo Wu, Xiamen (CN)

(73) Assignee: XIAMEN FORBETTER SANITARY WARE CO., LTD., Fujian (CN)

( * ) Notice: Subject to any disclaimer, the term of this patent is extended or adjusted under 35 U.S.C. 154(b) by 0 days.

(21) Appl. No.: 16/934,033

(22) Filed: Jul. 21, 2020

(65) Prior Publication Data
US 2021/0199212 A1 Jul. 1, 2021

(30) Foreign Application Priority Data
Dec. 27, 2019 (CN) .......................... 201911378806.3

(51) Int. Cl.
*F16K 31/524* (2006.01)
*E03C 1/23* (2006.01)

(52) U.S. Cl.
CPC ...... *F16K 31/52408* (2013.01); *E03C 1/2302* (2013.01)

(58) Field of Classification Search
USPC .......................................................... 137/801
See application file for complete search history.

(56) References Cited

U.S. PATENT DOCUMENTS

| 10,221,549 B1* | 3/2019 | Fregoe ................. E03C 1/2302 |
| 10,694,800 B2* | 6/2020 | Lau ........................ B29C 43/52 |
| 2014/0310864 A1* | 10/2014 | Ye ......................... E03C 1/2302 4/295 |
| 2015/0299995 A1* | 10/2015 | Ye ......................... E03C 1/2302 4/295 |
| 2017/0260724 A1* | 9/2017 | Beck ..................... E03C 1/2302 |

* cited by examiner

*Primary Examiner* — Daphne M Barry
(74) *Attorney, Agent, or Firm* — Leong C. Lei

(57) ABSTRACT

A drain plug linkage device includes a pull rod assembly, an operating rod, a drain plug, and a drain pipe. The pull rod assembly includes a pull rod and a connecting sleeve. The operating rod has a plurality of spaced recessed portions. The connecting sleeve and the operating rod are arranged crosswise. The connecting sleeve has a plurality of spaced positioning portions each having an opening. One of the recessed portions of the operating rod is selectively inserted through the opening of a corresponding one of the positioning portions to be positioned therein. The operation of adjusting the height of the pull rod assembly and the distance between the pull rod assembly and a washbasin, bathroom sink or hand wash sink is simple.

17 Claims, 11 Drawing Sheets

DRAIN PLUG LINKAGE DEVICE

BACKGROUND OF THE INVENTION

1. Field of the Invention

The present invention relates to a water drain device, and more particularly to a drain plug linkage device.

2. Description of the Prior Art

A vessel, such as a washbasin, bathroom sink or hand wash sink, is provided with a drain stopper, also known as a drain plug, to store or drain water in the vessel. The drain plug is usually in the form of a drain plug linkage structure.

A conventional drain plug linkage device comprises a pull rod assembly, an operating rod, a drain plug, and a drain pipe. The drain plug is accommodated in the upper end of the drain pipe. The pull rod assembly is linked to the operating rod. The drain plug is driven by the operating rod to move up and down, so that the operator can operate the pull rod assembly to open or close the drain plug for draining or storing water. The pull rod assembly includes a pull rod and a connecting sleeve. The connecting sleeve has a plurality of spaced positioning holes that don't communicate with each other. The operating rod has a plurality of spaced recessed portions. One of the recessed portions is selectively engaged with a corresponding one of the positioning holes. In the process of installation, when the operator wants to adjust the height of the pull rod assembly and the distance between the pull rod assembly and a vessel, such as a washbasin, bathroom sink or hand wash sink, etc., due to the limited space and angle, it is necessary to pull the pull rod away from the pull rod assembly before pulling the operating rod out of the connecting sleeve. After that, the selected recessed portion for the distance between the pull rod assembly and the vessel, such as a washbasin, bathroom sink or hand wash sink, etc., is engaged in the positioning hole at the desired height. Because the conventional drain plug linkage device is used in a narrow space under the vessel, such as a washbasin, bathroom sink or hand wash sink, etc. As a result, it is difficult to adjust the height of the pull rod assembly and the distance between the pull rod assembly and the vessel, such as a washbasin, bathroom sink or hand wash sink, etc. The installation is not easy.

Accordingly, the inventor of the present invention has devoted himself based on his many years of practical experiences to solve this problem.

SUMMARY OF THE INVENTION

The primary object of the present invention is to provide a drain plug linkage device that can be installed easily.

In order to achieve the above object, the present invention adopts the following solutions.

A drain plug linkage device comprises a pull rod assembly, an operating rod, a drain plug, and a drain pipe. The drain plug is accommodated in an upper end of the drain pipe. The pull rod assembly is linked to the operating rod. The drain plug is driven by the operating rod to move up and down. The pull rod assembly includes a pull rod and a connecting sleeve. The pull rod is linked to the connecting sleeve. The operating rod has a plurality of spaced recessed portions. The connecting sleeve and the operating rod are arranged crosswise. The connecting sleeve has a plurality of spaced positioning portions each having an opening. One of the recessed portions of the operating rod is selectively inserted through the opening to be positioned in a corresponding one of the positioning portions.

Preferably, the pull rod assembly further includes an outer cover. A lower end of the outer cover is fixed to an upper end of the connecting sleeve. An inner wall of an upper end of the outer cover is provided with a plurality of clamping members extending downward. An outer wall of the pull rod is formed with recesses for engagement of the respective clamping members. At least one button is provided on the upper end of the connecting sleeve. An inner wall of the button is provided with a plurality of inserts extending toward the pull rod. The inserts are movably interposed between the clamping members so that the clamping members can be selectively stretched out.

Preferably, the number of the at least one button is one.

Preferably, the outer cover is provided with a plurality of spaced second locking holes. An outer wall of the connecting sleeve is provided with a plurality of spaced second locking members to be engaged with the respective second locking holes.

Preferably, an outer wall of the drain pipe is formed with a threaded portion. A nut is screwed to the threaded portion. A washer is fixed on the nut.

Preferably, the pull rod assembly further includes an outer sleeve. The outer sleeve is integrally formed with a horizontal hole and a vertical hole communicating with the horizontal hole. The outer sleeve is sleeved on the connecting sleeve.

Preferably, the connecting sleeve includes at least one side wall. The positioning portions are disposed on the side wall. The positioning portions communicate with each other.

Preferably, an inner wall of the upper end of the drain pipe is provided with at least one inclined guide surface. The drain plug includes a stopper, at least two side blocks and an end portion connected with the operating rod. The stopper, the side blocks and the end portion are arranged in sequence from top to bottom. The side blocks are arranged at intervals. At least one of the side blocks has a width greater than that of the other side block. A lower end of at least one of the side blocks is provided with a mating surface. An upper end of the mating surface is slidable along the inclined guide surface. A lower end of the drain plug is formed with a perforation. When the upper end of the mating surface slides to abut against a bottom of the inclined guide surface, the perforation is just aligned with the operating rod.

Preferably, the drain plug linkage device further comprises a connecting assembly. The operating rod is inserted through the connecting assembly. A side wall of the drain pipe is formed with a notch. A wall of the notch is provided with at least one protruding engaging block. The connecting assembly is hermetically connected to the side wall of the drain pipe. An outer wall of the connecting assembly is convexly provided with at least one engaging groove. The outer wall of the connecting assembly is in contact with the wall of the notch. The engaging block is engaged in the engaging groove.

After adopting the above technical solutions, through the structural design of the connecting sleeve and the outer sleeve, the connecting sleeve and the operating rod are arranged crosswise, the connecting sleeve has the spaced positioning portions, and the operating rod has the recessed portions. In the process of installation, when the operator wants to adjust the height of the pull rod assembly and the distance between the pull rod assembly and a vessel, such as a washbasin, bathroom sink or hand wash sink, etc., the operating rod is moved for the recessed portion to be disengaged from the corresponding positioning portion. At this time, there is no need to pull out the pull rod or separate the operating rod, the operating rod can freely move left and right and up and down. When moved to a suitable installation position, the positioning portion and the recessed portion selectively engage with each other. After engagement, the operating rod and the connecting sleeve are completely positioned. The operation of adjusting the height of the pull rod assembly and the distance between the pull rod assembly and the vessel, such as a washbasin, bathroom sink or hand wash sink, etc., is simple. It is convenient to install the drain plug linkage device of the present invention.

DETAILED DESCRIPTION OF THE PREFERRED EMBODIMENTS

Embodiments of the present invention will now be described, by way of example only, with reference to the accompanying drawings.

Figure 1:
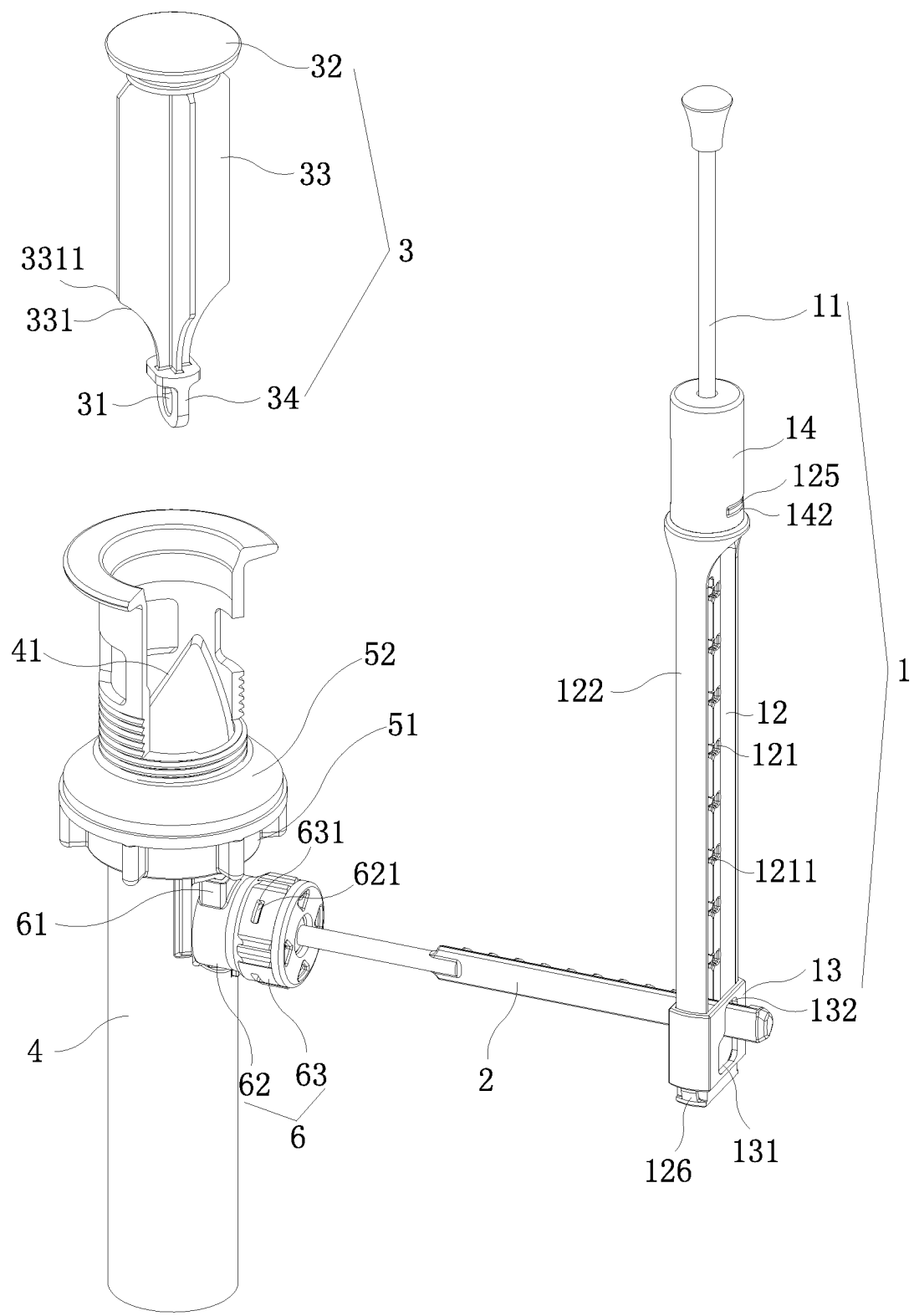
FIG. 1 is a first partial exploded view of the present invention.
Figure 2:
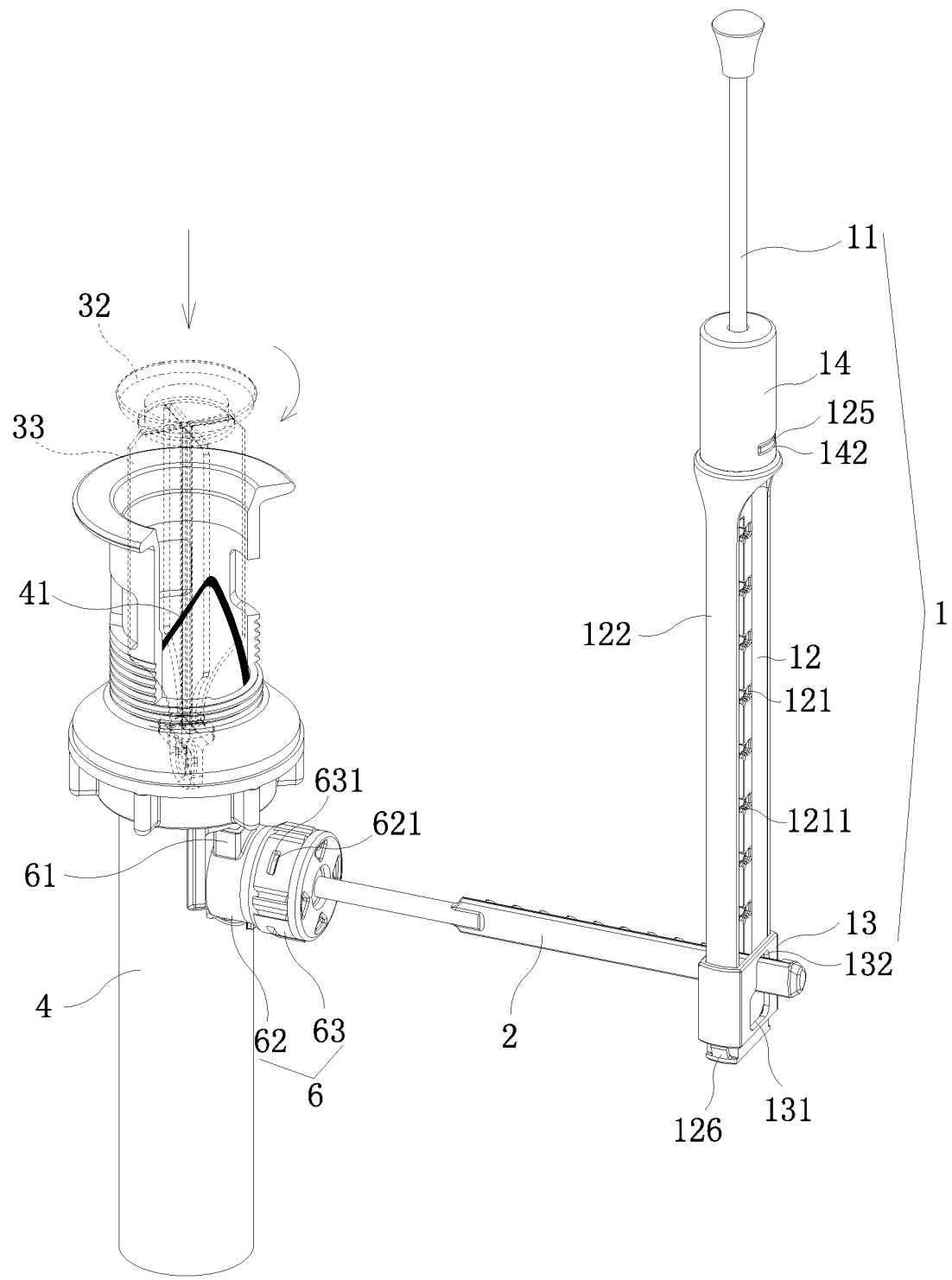
FIG. 2 is a partial assembled schematic view of the present invention.
Figure 3:
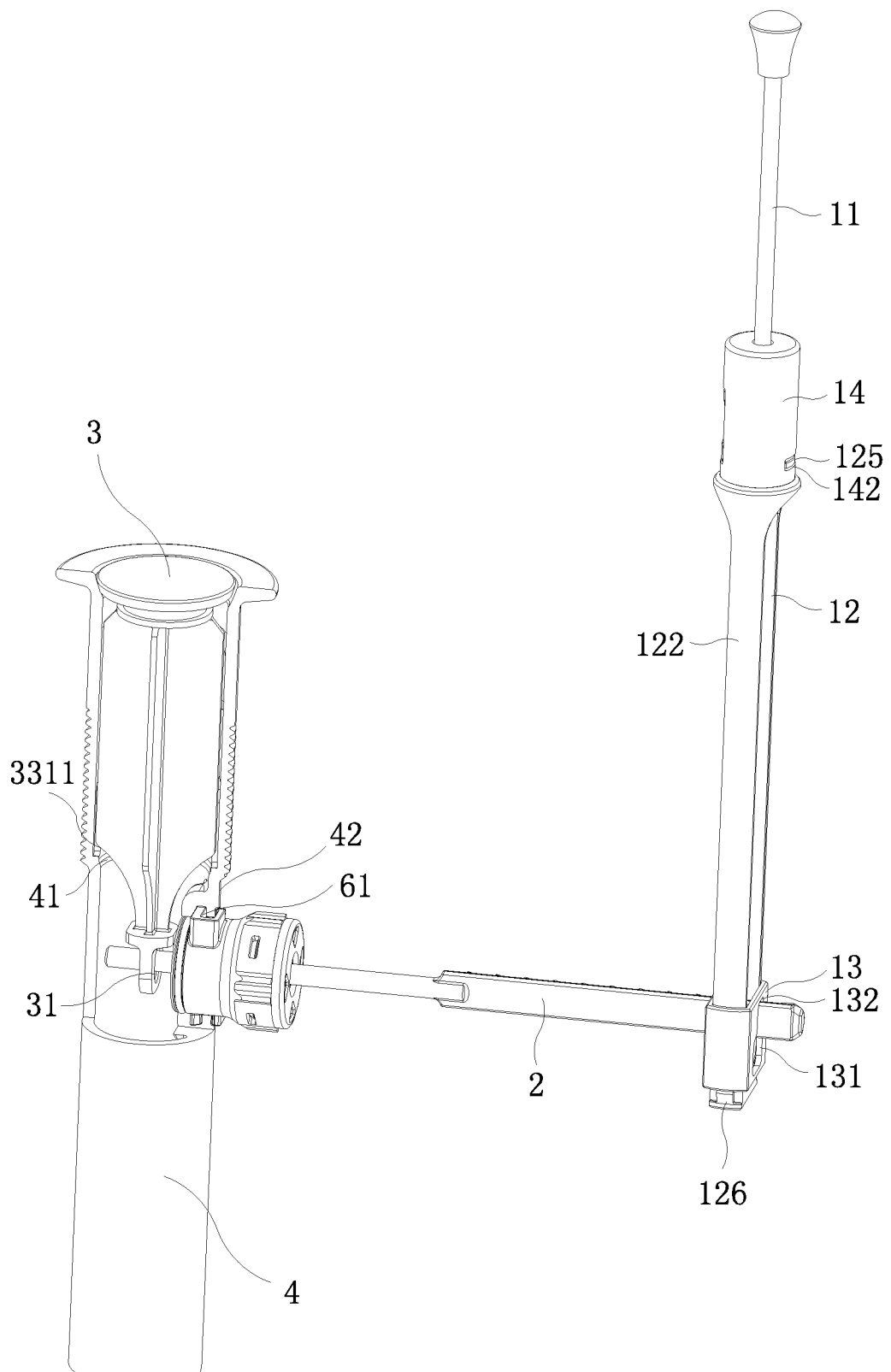
FIG. 3 is a partial cutaway view of the present invention.
Figure 4:
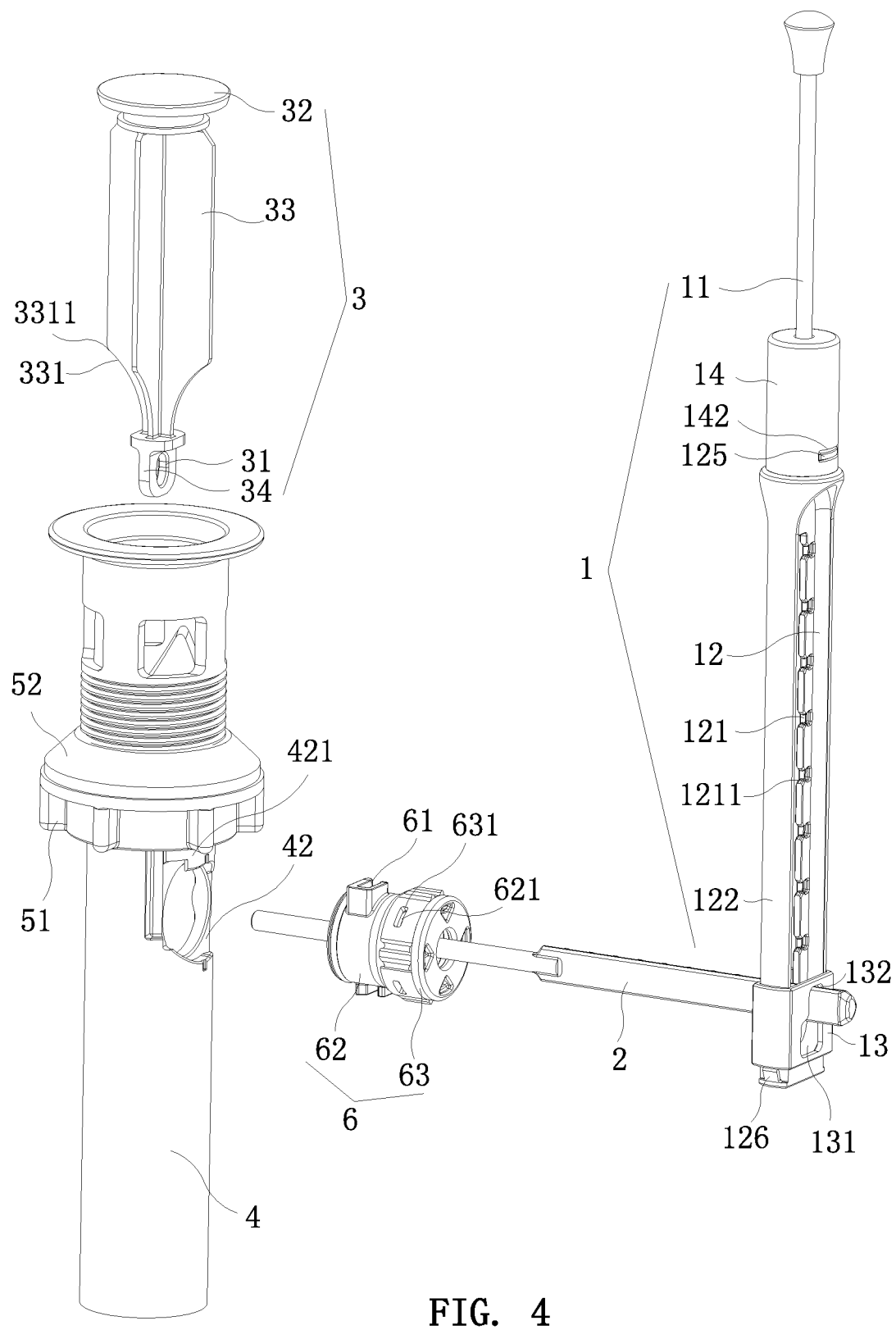
FIG. 4 is a second partial exploded view of the present invention.
Figure 5:
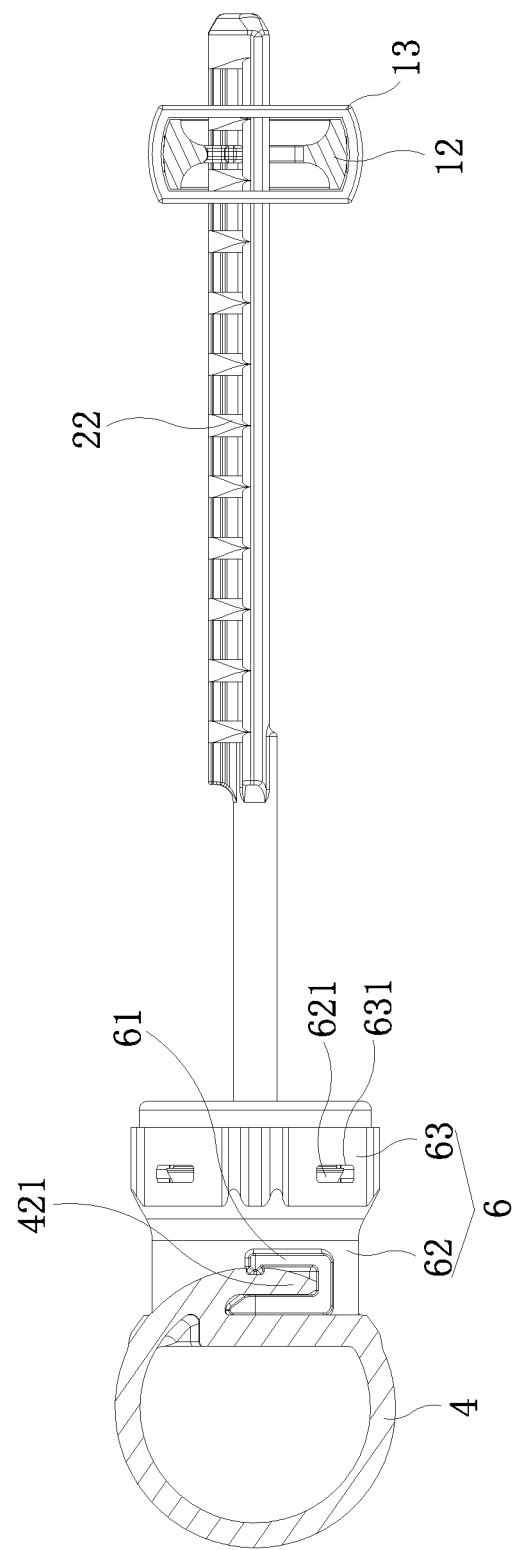
FIG. 5 is a first partial sectional view of the present invention.
Figure 6:
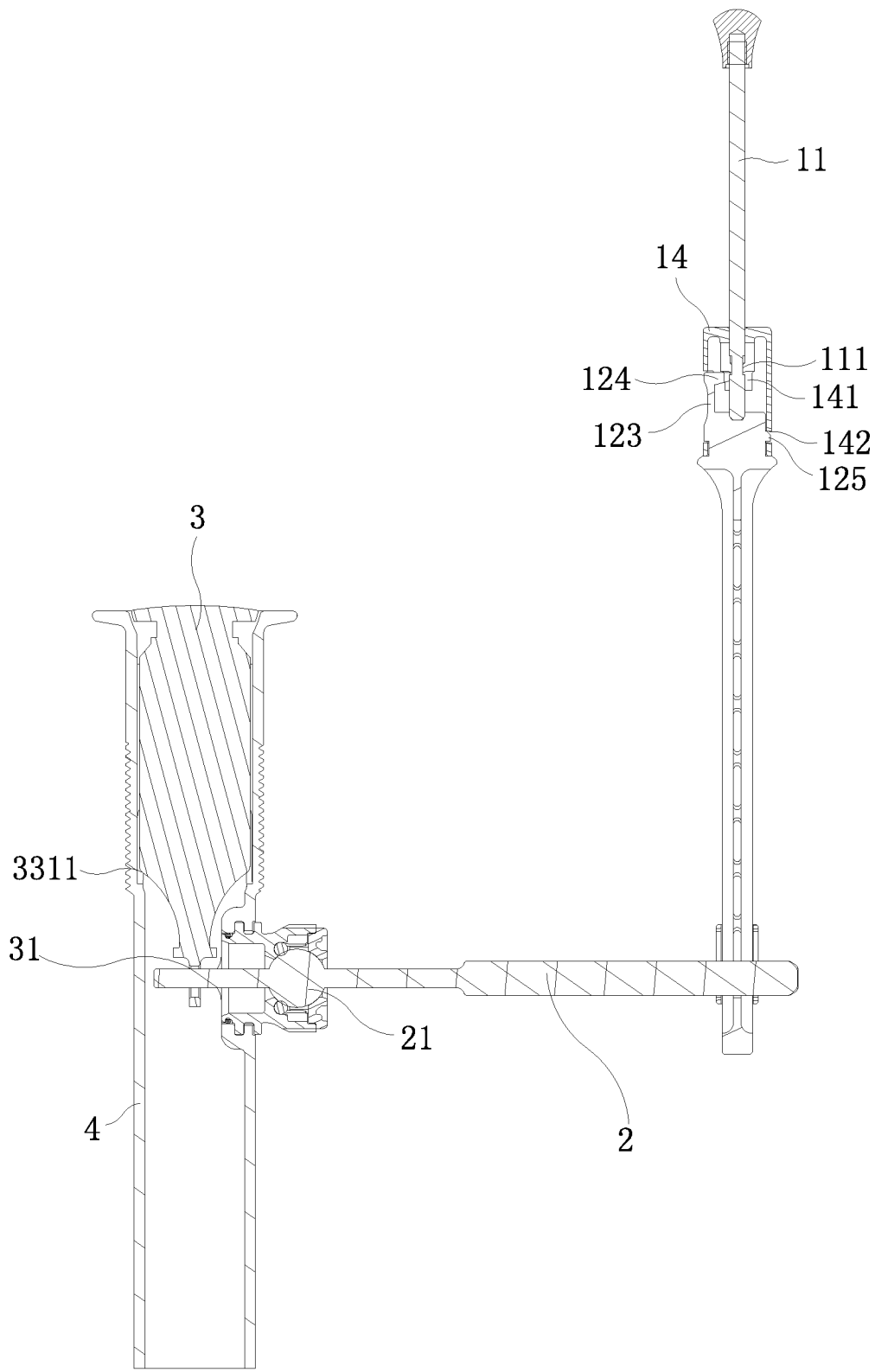
FIG. 6 is a sectional view of the present invention.
Figure 7:
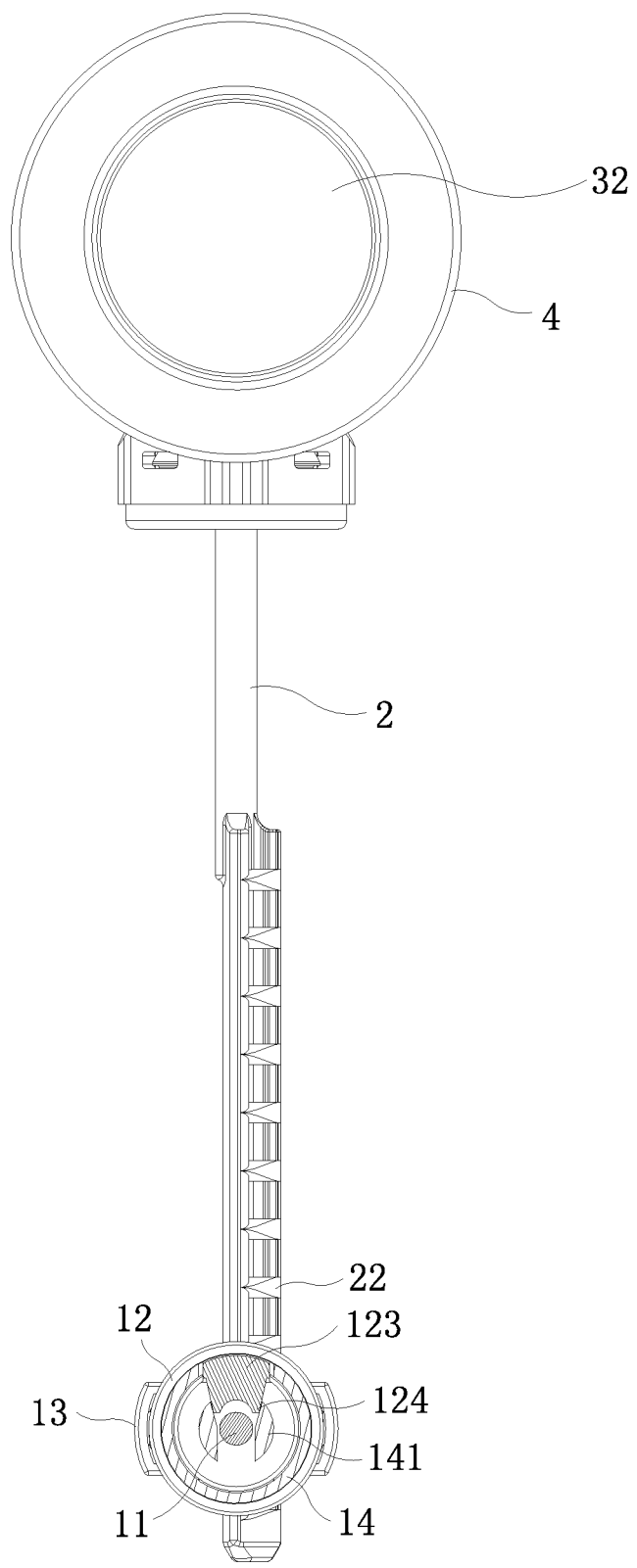
FIG. 7 is a second partial sectional view of the present invention.
Figure 8:
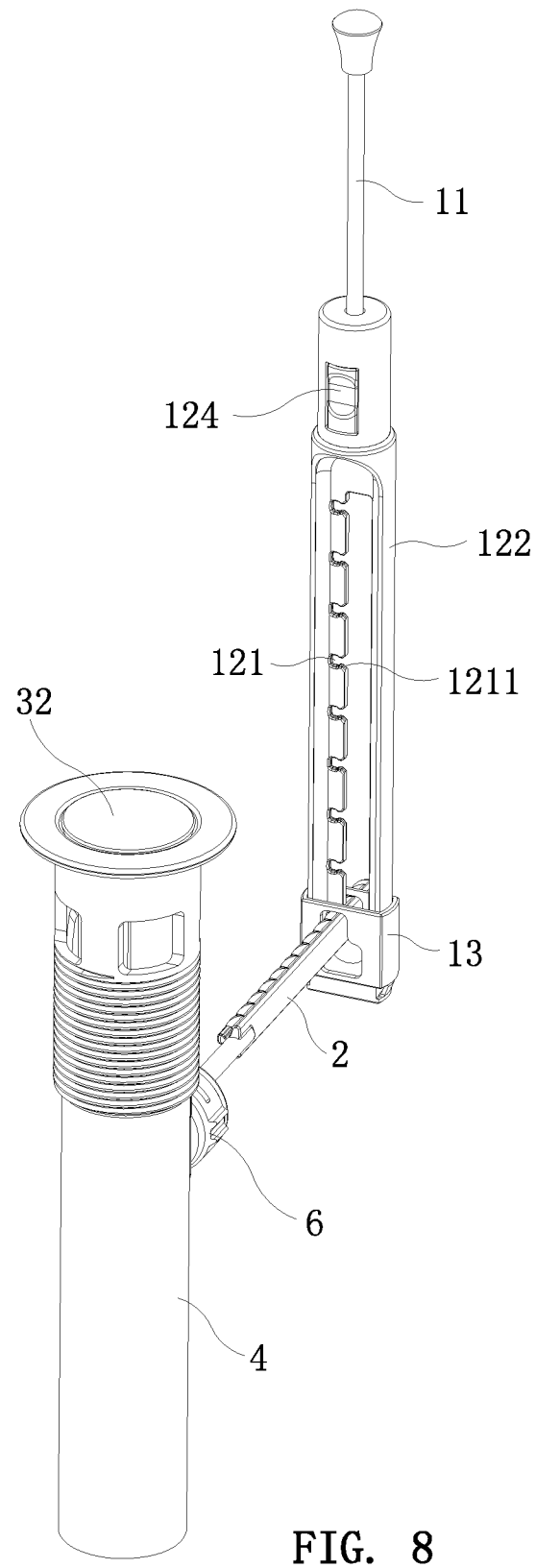
FIG. 8 is a first perspective view of the present invention when in use.
Figure 9:
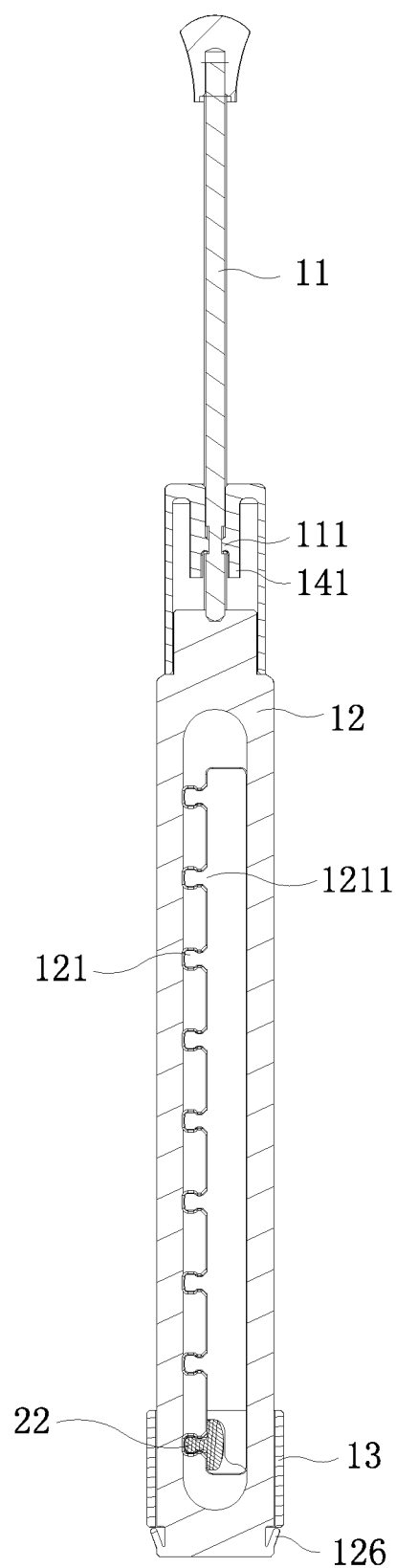
FIG. 9 is a partial sectional view of FIG. 8.
Figure 10:
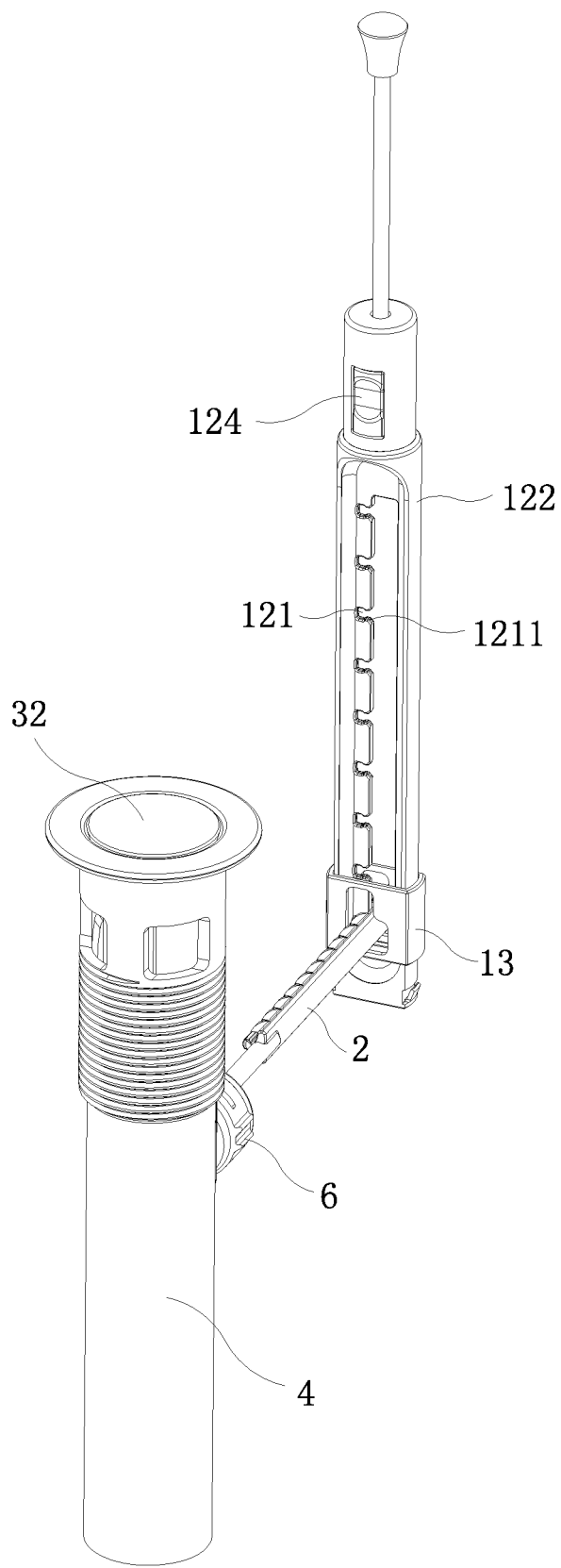
FIG. 10 is a second perspective view of the present invention when in use.
Figure 11:
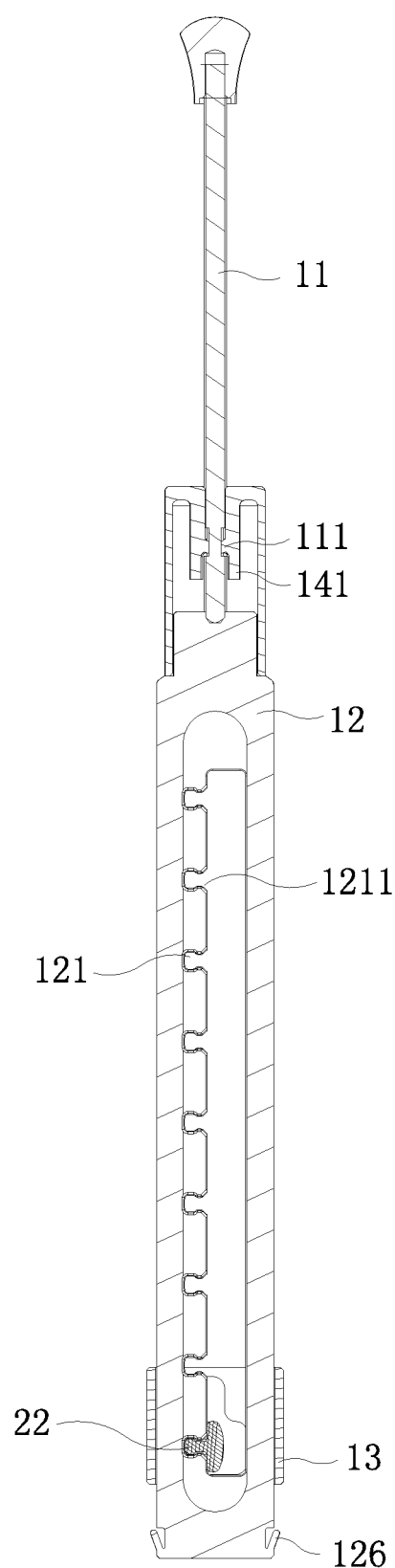
FIG. 11 is a partial sectional view of FIG. 10.

Referring to FIG. 1 through FIG. 11, the present invention discloses a drain plug linkage device, comprising a pull rod assembly 1, an operating rod 2, a drain plug 3, and a drain pipe 4. The drain plug 3 is accommodated in the upper end of the drain pipe 4. The pull rod assembly 1 is linked to the operating rod 2. The drain plug 3 is driven by the operating rod 2 to move up and down. The lower end of the drain plug 3 is formed with a perforation 31. The operating rod 2 passes through the drain pipe 4 and the perforation 31. The pull rod assembly 1 includes a pull rod 11, a connecting sleeve 12, and an outer sleeve 13. The pull rod 11 is linked to the connecting sleeve 12. The outer sleeve 13 is selectively moved on the connecting sleeve 12. The operating rod 2 has a plurality of spaced recessed portions 22. The connecting sleeve 12 and the operating rod 2 are arranged crosswise. The connecting sleeve 12 has a plurality of spaced positioning portions 121 each having an opening 1211. The outer sleeve 13 is integrally formed with a horizontal hole 131 and a vertical hole 132 communicating with the horizontal hole 131. The outer sleeve 13 is sleeved on the connecting sleeve 12. One of the recessed portions 22 of the operating rod 2 is selectively inserted through the vertical hole 132 and engaged with the opening 1211 of a corresponding one of the positioning portions 121. The positioning positions 121 may communicate with each other.

In the process of installation, referring to FIG. 8 through FIG. 11, when the operator wants to adjust the height of the pull rod assembly 1 and the distance between the pull rod assembly 1 and a vessel, such as a washbasin, bathroom sink or hand wash sink, etc., the outer sleeve 13 is moved up, so that the operating rod 2 is moved toward the horizontal hole 131, and the recessed portion 22 is disengaged from the corresponding positioning portion 121. At this time, there is no need to pull out the pull rod 11 or separate the operating rod 2, the operating rod 2 can move freely with the outer sleeve 13 left and right and up and down. When moved to a suitable installation position, the positioning portion 121 and the recessed portion 22 selectively engage with each other. After engagement, the operating rod 2 and the connecting sleeve 12 are completely positioned. Then, the outer sleeve 13 is moved down, and the recessed portion 22 is unable to disengage from the positioning portion 121 under the action of the side wall of the vertical hole 132 against the operating rod 2, so that the operation of adjusting the height of the pull rod assembly 1 and the distance between the pull rod assembly 1 and the vessel, such as a washbasin, bathroom sink or hand wash sink, etc., is simple. It is convenient to install the drain plug linkage device of the present invention, and it is easy to use and operate.

Furthermore, the bottom of the side wall of the connecting sleeve 12 may be provided with an elastic stop portion 126. When the outer sleeve 13 needs to be sleeved onto the connecting sleeve 12, the elastic stop portion 126 is pressed against the side wall of the connecting sleeve 12 for the outer sleeve 13 to be sleeved onto the connecting sleeve 12. After the outer sleeve 13 is sleeved onto the connecting sleeve 12, the elastic stop portion 126 is away from the side wall of the connecting sleeve 12 and leans against the bottom of the outer sleeve 13 to prevent the outer sleeve 13 from coming out.

The present invention may further comprise a connecting assembly 6. The operating rod 2 is inserted through the connecting assembly 6. The side wall of the drain pipe 4 is formed with a notch 42. The wall of the notch 42 is provided with at least one protruding engaging block 421. The connecting assembly 6 is hermetically connected to the side wall of the drain pipe 4. The outer wall of the connecting assembly 6 is convexly provided with at least one engaging groove 61. The outer wall of the connecting assembly 6 is in contact with the wall of the notch 42. The connecting assembly 6 can be rotated in the notch 42 for the engaging block 421 to be engaged in the engaging groove 61. Through the structural design of the connecting assembly 6, the drain pipe 4 and the operating rod 2 are quickly assembled, so that the connecting assembly 6 and the drain pipe 4 are connected and fixed quickly. Since the connecting assembly 6 and the drain pipe 4 of the present invention are formed separately, the connecting assembly 6 does not affect the connection of the upper end of the drain pipe 4 and the vessel, such as a washbasin, bathroom sink or hand wash sink, etc. When the space under the vessel is narrow, it is easy to install the present invention. When installed, the upper end of the drain pipe 4 is first fixed to the vessel, such as a washbasin, bathroom sink or hand wash sink, etc., and then the connecting assembly 6 is connected to the drain pipe 4 and the operating rod 2.

In an embodiment, two upper and lower engaging blocks 421 and two upper and lower engaging grooves 61 are provided. The engaging block 421 may be provided with a groove, and the inner wall of the engaging groove 61 may be provided with a protrusion to be engaged in the groove, so that the connecting assembly 6 and the drain pipe 4 are firmly connected. The engaging groove 61 has a U-shaped cross section. The end of the connecting assembly 6, extending into the drain pipe 4, is provided with a sealing ring, so that the connecting assembly 6 and the drain pipe 4 are tightly connected.

Furthermore, the inner wall of the upper end of the drain pipe 4 is provided with at least one inclined guide surface 41. The drain plug 3 includes a stopper 32, at least two side blocks 33, and an end portion 34 having the perforation 31 that are arranged in sequence from top to bottom. The side blocks 33 are arranged at intervals. At least one of the side blocks 33 has a width greater than that of the other side blocks 33. The lower end of at least one of the side blocks 33 is provided with a mating surface 331 that is gradually reduced inward from top to bottom. An upper end 3311 of the mating surface 331 can slide along the inclined guide surface 41. When the upper end 3311 of the mating surface 331 slides to abut against the bottom of the inclined guide surface 41, the perforation 31 is just aligned with the operating rod 2. Because the inner wall of the drain pipe 4 is provided with the inclined guide surface 41, and at least one of the side blocks 33 of the drain plug 3 has a width greater than that of the other side blocks 33, and at least one of the side blocks 33 is provided with the mating surface 331 to mate with the inclined guide surface 41, the operator can easily determine the widest side block 33. The mating surface 331 of the widest side block 33 is aligned with the inclined guide surface 41 for the drain plug 3 to be installed, and the upper end 3311 of the mating surface 331 slides from the top of the inclined guide surface 41 to the bottom of the inclined guide surface 41. At this time, the perforation 31 of the drain plug 3 is aligned with the operating rod 2, so that the operating rod 2 can quickly pass through the perforation 31. The drain plug 3 and the operating rod 2 can be assembled quickly, so that the overall assembly efficiency is improved.

In an embodiment, the number of the inclined guide surfaces 41 is two, but not limited thereto. Other numbers may be applicable. The inclined guide surfaces 41 are connected together. The width of the two side blocks 33 is greater than the width of the other side blocks 33. The lower ends of the two side blocks 33 are provided with the mating surfaces 331, respectively. The two side blocks 33 are arranged symmetrically on the central axis of the drain plug 3. The upper ends 3311 of the mating surfaces 331 of the two side blocks 33 can slide to the bottoms of the corresponding inclined guide surfaces 41 respectively, so that the perforation 31 can be aligned with the operating rod 2 more quickly.

Furthermore, the outer wall of the drain pipe 4 may be formed with a threaded portion. A nut 51 is screwed to the threaded portion. A washer 52 is fixed on the nut 51. In the present invention, the position where the nut 51 is screwed can be adjusted according to the thickness of a vessel, such as a washbasin, bathroom sink or hand wash sink, etc., which is convenient for the upper end of the drain pipe 4 to be fixed to the vessel, such as a washbasin, bathroom sink or hand wash sink, etc. The nut 51 and the washer 52 are fixedly mounted under the vessel, such as a washbasin, bathroom sink or hand wash sink, etc., thereby completing the assembly with the vessel, such as a washbasin, bathroom sink or hand wash sink, etc. The drain pipe 4 is integrally formed. The outer side wall below the threaded portion of the drain pipe 4 has no protrusion higher than the threaded section, ensuring that the nut 51 and the washer 52 can pass through the drain pipe 4 from the bottom up.

Furthermore, the operating rod 2 may have a spherical head 21. The connecting assembly 6 includes a body 62 and a cover 63. The spherical head 21 is accommodated in the body 62. The cover 63 is fixedly connected to the body 62. The arrangement of the spherical head 21 facilitates the rotation of the operating rod 2. A sealing ring may be provided between the spherical head 21 and the body 62 to improve the tightness of the connecting assembly 6.

In order to facilitate the connection of the body 62 and the cover 63, the outer wall of the body 62 may be provided with a plurality of spaced first locking members 621, and the cover 63 may be provided with a plurality of first locking holes 631 for engagement of the first locking members 621.

The pull rod assembly 1 may further include an outer cover 14. The lower end of the outer cover 14 is fixed to the upper end of the connecting sleeve 12. The inner wall of the upper end of the outer cover 14 is provided with a plurality of clamping members 141 extending downward. The outer wall of the pull rod 11 is formed with recesses 111 for engagement of the respective clamping members 141. At least one button 123 is provided on the upper end of the connecting sleeve 12. The inner wall of the button 123 is provided with a plurality of inserts extending toward the pull rod 11. The inserts 124 are movably interposed between the clamping members 141, so that the clamping members 141 can be selectively stretched out. The operator can press the button 123 to interpose the inserts 124 of the button 123 between the respective clamping members 141, so that the clamping members 141 are stretched out to disengage from the recesses 111 of the pull rod 11, and the pull rod 11 can be pulled out smoothly. When the operator releases the button 123, the inserts 124 of the button 123 are withdrawn from the respective clamping members 141, the pull rod 11 is inserted into the outer cover 14, and the clamping members 141 are first stretched by the pull rod 11. When the clamping members 141 are moved to be aligned with the recesses 111, the clamping members 141 are returned to be engaged with the recesses 111 under the action of the elastic force. This facilitates the disassembly and assembly of the present invention.

In addition, the outer cover 14 is provided with a plurality of spaced second locking holes 142. The outer wall of the connecting sleeve 12 is provided with a plurality of spaced second locking members 125 to be engaged with the respective second locking holes 142. Therefore, the outer cover 14 and the connecting sleeve 12 can be quickly assembled.

As shown in FIG. 1 through FIG. 11, the recessed portion 22 is a gap formed between every two adjacent raised blocks. The connecting sleeve 12 includes two side walls 122. One of the side walls 122 is provided with the positioning portions 121. The number of the button 123 is one. The width of the opening 1211 of the positioning portion 121 is less than the width inside the positioning portion 121.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A drain plug linkage device, comprising a pull rod assembly, an operating rod, a drain plug and a drain pipe, the drain plug being accommodated in an upper end of the drain pipe, the pull rod assembly being linked to the operating rod, the drain plug being driven by the operating rod to move up and down; the pull rod assembly including a pull rod and a connecting sleeve, the pull rod being linked to the connecting sleeve, the operating rod having a plurality of spaced recessed portions, the connecting sleeve and the operating rod being arranged crosswise, the connecting sleeve having a plurality of spaced positioning portions each having an opening, one of the recessed portions of the operating rod being selectively inserted through the opening to be positioned in a corresponding one of the positioning portions, wherein an inner wall of the upper end of the drain pipe is provided with at least one inclined guide surface, the drain plug includes a stopper, at least two side blocks and an end portion connected with the operating rod, the stopper, the side blocks and the end portion are arranged in sequence from top to bottom, the side blocks are arranged at intervals, at least one of the side blocks has a width greater than that of the other side block, a lower end of at least one of the side blocks is provided with a mating surface, an upper end of the mating surface is slidable along the inclined guide surface, a lower end of the drain plug is formed with a perforation; when the upper end of the mating surface slides to abut against a bottom of the inclined guide surface, the perforation is just aligned with the operating rod.

2. The drain plug linkage device as claimed in claim 1, wherein the pull rod assembly further includes an outer cover, a lower end of the outer cover is fixed to an upper end of the connecting sleeve, an inner wall of an upper end of the outer cover is provided with a plurality of clamping members extending downward, an outer wall of the pull rod is formed with recesses for engagement of the respective clamping members, at least one button is provided on the upper end of the connecting sleeve, an inner wall of the button is provided with a plurality of inserts extending toward the pull rod, and the inserts are movably interposed between the clamping members so that the clamping members can be selectively stretched out.

3. The drain plug linkage device as claimed in claim 2, wherein the number of the at least one button is one.

4. The drain plug linkage device as claimed in claim 3, wherein an outer wall of the drain pipe is formed with a threaded portion, a nut is screwed to the threaded portion, and a washer is fixed on the nut.

5. The drain plug linkage device as claimed in claim 3, wherein the pull rod assembly further includes an outer sleeve, the outer sleeve is integrally formed with a horizontal hole and a vertical hole communicating with the horizontal hole, and the outer sleeve is sleeved on the connecting sleeve.

6. The drain plug linkage device as claimed in claim 3, wherein the connecting sleeve includes at least one side wall, the positioning portions are disposed on the side wall, and the positioning portions communicate with each other.

7. The drain plug linkage device as claimed in claim 2, wherein the outer cover is provided with a plurality of spaced second locking holes, an outer wall of the connecting sleeve is provided with a plurality of spaced second locking members to be engaged with the respective second locking holes.

8. The drain plug linkage device as claimed in claim 7, wherein an outer wall of the drain pipe is formed with a threaded portion, a nut is screwed to the threaded portion, and a washer is fixed on the nut.

9. The drain plug linkage device as claimed in claim 7, wherein the pull rod assembly further includes an outer sleeve, the outer sleeve is integrally formed with a horizontal hole and a vertical hole communicating with the horizontal hole, and the outer sleeve is sleeved on the connecting sleeve.

10. The drain plug linkage device as claimed in claim 7, wherein the connecting sleeve includes at least one side wall, the positioning portions are disposed on the side wall, and the positioning portions communicate with each other.

11. The drain plug linkage device as claimed in claim 2, wherein an outer wall of the drain pipe is formed with a threaded portion, a nut is screwed to the threaded portion, and a washer is fixed on the nut.

12. The drain plug linkage device as claimed in claim 2, wherein the pull rod assembly further includes an outer sleeve, the outer sleeve is integrally formed with a horizontal hole and a vertical hole communicating with the horizontal hole, and the outer sleeve is sleeved on the connecting sleeve.

13. The drain plug linkage device as claimed in claim 2, wherein the connecting sleeve includes at least one side wall, the positioning portions are disposed on the side wall, and the positioning portions communicate with each other.

14. The drain plug linkage device as claimed in claim 1, wherein an outer wall of the drain pipe is formed with a threaded portion, a nut is screwed to the threaded portion, and a washer is fixed on the nut.

15. The drain plug linkage device as claimed in claim 1, wherein the pull rod assembly further includes an outer sleeve, the outer sleeve is integrally formed with a horizontal hole and a vertical hole communicating with the horizontal hole, and the outer sleeve is sleeved on the connecting sleeve.

16. The drain plug linkage device as claimed in claim 1, wherein the connecting sleeve includes at least one side wall, the positioning portions are disposed on the side wall, and the positioning portions communicate with each other.

17. The drain plug linkage device as claimed in claim 1, further comprising a connecting assembly, the operating rod being inserted through the connecting assembly, a side wall of the drain pipe being formed with a notch, a wall of the notch being provided with at least one protruding engaging block, the connecting assembly being hermetically connected to the side wall of the drain pipe, an outer wall of the connecting assembly being convexly provided with at least one engaging groove, the outer wall of the connecting assembly being in contact with the wall of the notch, the engaging block being engaged in the engaging groove.

* * * * *